Figure 1:
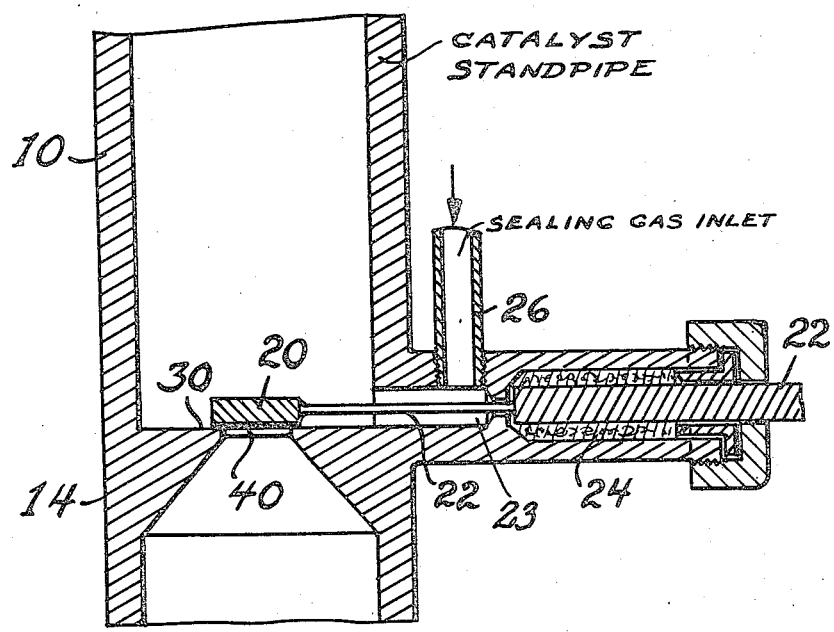

Patented Oct. 18, 1949

2,485,316

UNITED STATES PATENT OFFICE 2,485,316

SLIDE VALVE

Leroy V. Robbins, Jr., and William D. Luening, Baton Rouge, La., assignors to Standard Oil Development Company, a corporation of Delaware Application December 30, 1944, Serial No. 570,740

2 Claims. (Cl. 251—51)

This invention relates to a valve for the handling of finely divided solids, and in particular to a slide valve for handling fluidized solids in standpipes employed in fluid catalyst operations.

Among recent industrial developments, the use of finely divided solids as constituents of gas-solid dispersions has achieved particular significance as a means of effecting many chemical and physical reactions, depending to a considerable extent on surface catalytic or adsorptive effects. In this manner an extremely fine division of the solid material has been attained, coupled with the advantages of continued circulation of the finely divided solids in the gas phase. The solids in these uses are so finely divided that they can readily be held in suspension to form gas-solid dispersions behaving as fluidized masses subject to hydrostatic laws closely approximating those for liquids. Indeed, with the gas-solid dispersions usually formed one means of insuring flow throughout a treating system is to build up a "head" of the gas-solid dispersion in equipment commonly known in the petroleum industry as a "standpipe." In order to provide for continued fluidity of the mass in such equipment, means are usually available for injecting fluidizing gas into the gas-solid dispersion throughout the length of the standpipe. This movement of the gas-solid dispersions in the standpipe has the disadvantage, however, of involving erosion especially in valves, bends and constricted portions of the equipment. This invention is concerned with the design of a slide valve which minimizes the erosive action of gas-solid dispersions at a flow control point requiring a valve as the control means.

In conventional slide valves, the slide or gate is located under its seat and is supported and guided by the lower portion of the casing. The portion of the slide in contact with the seat in these valves is thus subjected to the pressure differential across the valve, tending to force the co-operating surfaces apart and to cause leakage between such surfaces and also those of the slide enclosed within the guides. The leakage in this manner of gas-solid dispersions through slide valves is particularly disastrous because of the erosive consequences upon the co-operating surfaces between the slide and its seat and its guide, between which there is usually an allowed clearance for operation of between 0.01 and 0.15 inches. If the co-operating surfaces are not smooth and true, a good seal cannot be obtained and the application of adjustment pressure against the surfaces is merely the cause of added friction and leakage. The design of the valve of this invention overcomes these disadvantages and eliminates or minimizes considerably any leakage.

In the valve of this invention the slide is located on the top of its seat or bearing surface. The bearing surface is moreover the upper surface of a stationary element within the standpipe. The pressure differential of the gas-solid dispersion, as, for example, between 5 and 10 pounds per square inch in the standpipes of catalytic cracking systems, is a means of holding the slide in direct contact with its seat. Also, the working end of the slide may be tapered or formed as a step to fit into a corresponding recessed portion of an upward projection of the valve seat so as to permit of a closer seal between the end of the slide and the corresponding portion of the casing. The slide, however, is usually of a simple flat plate type since it is advisable for replacement purposes that the construction be as simple as possible in case erosion occurs around the edges of the slide. Moreover, seal or fluidizing gas may be injected at the top of the valve slide for the purpose of aerating and removing any material which might collect and interfere with the movement of the slide. Furthermore, below the valve seat the metallic element is tapered toward the supporting side of the equipment so as to obviate erosion of the valve body below the slide in eliminating the feature of back-lash of the finely divided solid particles after their passage through the valve port. The port or opening in the valve over which the slide operates may be of any shape but is usually either circular or rectangular. The materials of construction of the slide and valve seat are those of the metals commonly employed in the fabrication of slide valves: in the case of the valves constructed for use in connection with the standpipes in catalytic cracking the material is often carbon steel. The valve seat may be part of the slide valve, being welded or bolted to the equipment at the appropriate place, or it may be separately constructed as particularly desired.

Figure 2:
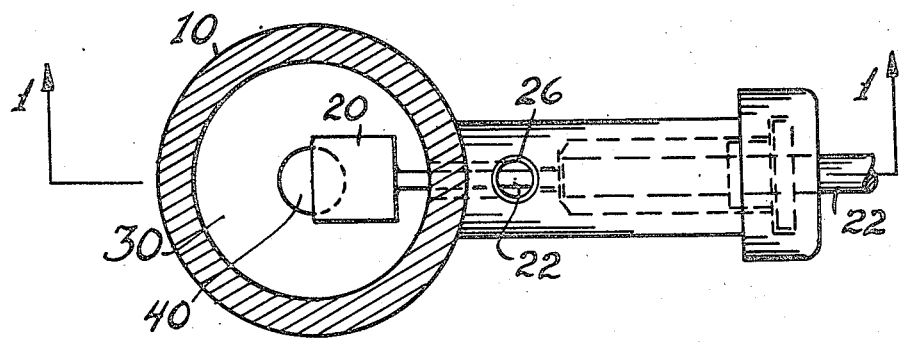

In order that the invention may be more fully understood, a drawing is presented of an embodiment in Figures 1 and 2. Figure 1 is a cross-sectional view of a standpipe as portion of equipment for the catalytic cracking of a petroleum stock showing a slide valve at a portion therein. Figure 2 is an elevational view. Figure 1 is shown as being taken along the line I—I of Figure 2. Similar numerals designating portions of the equipment are used for the same corresponding parts.

In Figure 1, a standpipe 10 is shown as having attached thereto a valve consisting of the slide 20, the seating element 30 and port 40. The slide 20 is shown as being of simple horizontal plate construction. It is connected to stem 22 which passes through the packing chamber 24 permitting external means (not shown) of controlling the movement of the slide over its seat. The seating element 30 is shown as tapering downwards from the port 40 to the side of the standpipe 10. The slide 20 and the seating element 30 are constructed of carbon steel and connected to the standpipe. Connected to the chamber 23 surrounding the valve stem 22 is a pipe 26 through which sealing gas is injected on to the top of the slide 20. The port 40 is shown in Figure 2 as being of circular cross-section.

The above valve was found to give highly satisfactory service in connection with catalytic cracking operations carried out at approximately 850–975° F., 12 pounds per square inch gauge pressure, 2000–6000 pounds of catalyst per minute per square foot area of hole, a pressure differential of ½" to 12" Hg across the valve, and a gas velocity of 20 standard cubic feet per hour.

An important feature with regard to the above valve is that the maintenance of the same diameter as the standpipe above the valve seat does not cause an increase in the velocity of the fluidized mixture and therefore excessive swirling effects.

What is claimed is:

1. A valve for controlling the flow of fluidized solids in a vertical standpipe which comprises a circular valve conduit structure having concentrically disposed therein a circular seat structure, the longitudinal axis of which is parallel to the longitudinal axis of said valve conduit structure, said circular seat structure being characterized by a port in the center thereof, by a flat upper surface which extends into said valve conduit structure to collect fluidized solids thereon, said seat structure being further characterized by lower conical walls extending from said port downwardly and outwardly to the walls of said conduit structure, said valve also comprising a slide adapted to close said port, stem means for sliding said slide from said port over said flat upper surface, and means for introducing a blowing gas over the area of said flat upper structure over which said slide moves to remove the fluidized solids therefrom.

2. Apparatus defined by claim 1 wherein said means for introducing blowing gas are adapted to introduce the blowing gas adjacent said upper flat surface and perpendicular to the edge of the slide attached to the valve stem.

LEROY V. ROBBINS, JR.
WILLIAM D. LUENING.

REFERENCES CITED

The following references are of record in the file of this patent:

UNITED STATES PATENTS

| Number | Name | Date |
|---|---|---|
| 534,360 | Collins | Feb. 19, 1895 |
| 592,478 | Neeland | Oct. 26, 1897 |
| 1,112,066 | Hollis | Sept. 29, 1914 |
| 1,334,248 | Kling | Mar. 16, 1920 |
| 1,529,178 | Greenwood | Mar. 10, 1925 |
| 1,613,509 | Gill | Jan. 4, 1927 |
| 2,031,151 | Eulberg | Feb. 18, 1936 |
| 2,305,724 | Luetzelschwab | Dec. 22, 1942 |
| 2,359,029 | Goldberg | Sept. 26, 1944 |

FOREIGN PATENTS

| Number | Country | Date |
|---|---|---|
| 9,381 | Great Britain | 1842 |